June 22, 1943.    T. F. PAYNE    2,322,587
PIPE JOINT
Filed July 21, 1942

INVENTOR
Thomas F. Payne
by Christy, Parmelee and Strickland
his attorneys

Patented June 22, 1943

2,322,587

UNITED STATES PATENT OFFICE 2,322,587

PIPE JOINT

Thomas F. Payne, Cincinnati, Ohio

Application July 21, 1942, Serial No. 451,702

1 Claim. (Cl. 285—115)

This invention relates to pipe joints, and more particularly to telescopic pipe joints in which the assembled pipe ends are united and sealed by means of a cement or sealing compound. The invention consists in improvements in the structure of the cooperating pipe ends, whereby a superior and more readily assembled joint is provided.

In the usual telescopic or bell-and-spigot pipe joint, a sealing compound or packing is introduced and tamped home between the assembled pipe ends, and to the extent that a clearance must be provided between the pipe ends to receive the sealing material and to give access to the tamping tools, the sealing material in the finished joint remains exposed, with the possibility that it may work free in such manner as to impair the joint. Furthermore, the labor and time entailed in the packing of such joints is an item that makes for relatively high installation costs.

In the pipe joint of this invention, a coating of cement or sealing compound is applied to one (or to both) of the cooperating pipe ends before assembly is made. When the so prepared pipe ends are assembled and forced together, no other labor is required. In due course, the cement or sealing compound solidifies and completes the joint. While others hitherto may have proposed pipe joints of this general type, it is to be understood that this invention consists of particular improvements in the form of the cooperating pipe ends, by virtue of which certain definite advantages are gained, among which are:

First, in the completed joint the cement or sealing compound is entirely closed within the united pipe ends. No seam or other opening exists, through which the sealing material may escape in such manner as to weaken the joint, or to cause leakage.

Second, the cement or sealing material is compressed and contained within an annular chamber that is formed by and between the bodies of the cooperating pipe ends.

Third, the cement or sealing material applied to the pipe ends is automatically distributed and uniformly compressed within the said annular chamber when the two pipe ends are telescopically assembled.

Fourth, on each side of the said annular chamber, the assembled pipe ends bear upon one another in an annular surface of contact, providing between the pipe ends two axially spaced areas of contact, which not only insure that the pipe ends shall come to proper alignment when assembly is being made, but insure greater rigidity of union after assembly has been made and the cement or sealing compound solidified.

In the accompanying drawing, in which an embodiment of the invention is illustrated:

Figure 2:
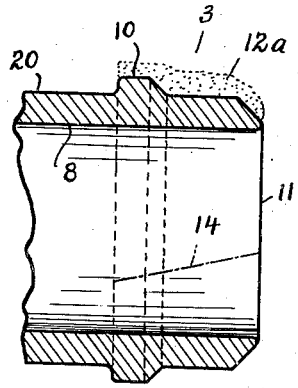
Figure 2 is a fragmentary sectional view of the male or spigot end of a second length of pipe, in position to be inserted in the female or bell end of the pipe of Figure 1.

The pipe joint of this invention is particularly, but not exclusively, designed for pipes and pipe fittings of terra-cotta or cast metal. Referring to the drawing, the end 3 of such a pipe 2 is formed as a spigot portion and the opposite end 4 as a bell portion. In assembling the pipe 2 with a pipe fitting, or with another pipe, 20, by means of the joint of this invention, the spigot portion 3 of the pipe 20 is introduced and secured in the bell portion 4 of the pipe 2. The bell portion 4 is formed with two internal annular shoulders 5 and 6. These shoulders are concentric. They are spaced apart axially of the pipe, and the inner shoulder 6 is of smaller diameter than the outer shoulder 5. Outwardly from the shoulder 6, the bell portion includes a cylindrical bore portion 7 of larger diameter than the bore 8 of the pipe, while outward from shoulder 5, the bell portion includes a cylindrical bore portion 9 of larger diameter than bore portion 7. On the spigot portion 3, a circumferential rib 10 is integrally formed, and it will be noted that this rib is spaced from the terminal 11 of the spigot portion, and is of slightly smaller diameter than the bore portion 9 of the cooperating pipe end, while the bore portion 7 of such pipe end is of slightly larger diameter than the outer surface of the spigot body between its terminal 11 and rib 10.

Figure 3:
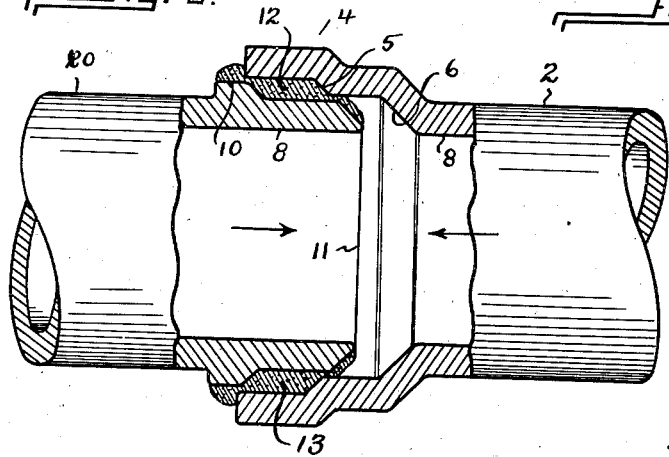
Figure 3 is a fragmentary view, partially in section and partially in elevation, of the cooperating ends of the two lengths of pipe of Figures 1 and 2. The cement or sealing compound is shown in cross section, with the pipe ends in an incomplete position of assembly.
Figure 4:
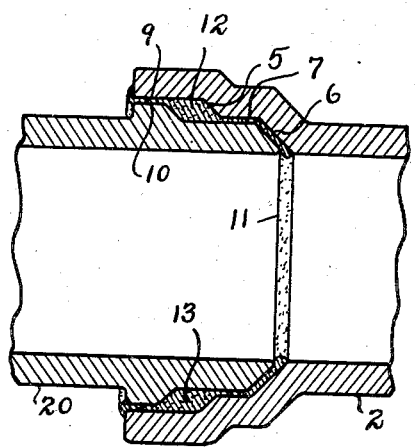
Figure 4 is a view in section of the pipe ends in ultimate position of assembly, forming with the cement or sealing compound, the pipe joint of this invention.

Preparatory to making an assembly of the pipe ends, a coating of cement or sealing compound 12 is externally applied to the spigot portion 3. In the usual case, the applied coating will extend around the entire circumference of the pipe, and will overlie the rib 10, as well as the rest of the spigot body. If desired, a coating of the cement or sealing compound may, alternatively or additionally, be applied to the internal surfaces of the bell portion 4. When the parts have been adequately coated, the pipe ends are telescopically assembled, as indicated by arrows in Figure 3, and the spigot portion is forced inward into the bell portion to the ultimate position illustrated in Figure 4. It will be observed that between the rib 10 of the spigot portion and the outer shoulder 5 of the bell portion, the telescoped pipe ends provide an annular chamber 13, into which the cement or sealing compound 12 is pressed and uniformly distributed. When the sealing material 12 solidifies, it forms within the annular chamber 13 a solid ring that both seals and integrates the assembled pipe ends.

The rib 10 of the spigot fits the outer bore portion 9 of the bell, while the terminal portion of the spigot fits the inner bore portion 7 of the bell. Slight clearances are provided between these interfitting portions of the bell and spigot, to facilitate the assembly of the parts, and to permit of a self-distributing movement of the plastic sealing material as the parts are thrust into fully assembled position. These clearances in the ultimate joint are closed by thin fillets of solidified sealing material. The terminal edge 11 of the spigot is positioned in alignment with and in substantial abutment upon the inner shoulder 6 of the bell portion, and between these parts, also, there is a thin fillet of sealing material. Thus, it will be perceived that in the completed joint, the body of sealing material within the chamber 13 is effectively protected against such deleterious conditions as may exist either within or without the conduit formed by the joined pipes.

The joined pipe ends are engaged in two annular areas of contact, namely, the area of contact of bore portion 7 with the end portion of the spigot, and that of the bore portion 9 with the rib on the spigot. These mutually engaging areas of contact, extending circumferentially of the spigot and on opposite sides of the sealing chamber 13, afford not only greater security of assembly, but insure the accurate alignment of the pipe ends while assembly is being made. The thin fillets of solidified sealing material, extending between the surfaces in these areas, serve to perfect the desired contact or engagement of the pipe ends.

The annular shoulder 5 within the bell is beveled, with the convergence of bevel directed inwardly with respect to the mouth of the bell, and the face of the rib 10 is correspondingly beveled. In like manner the shoulder 6 within the bell and the terminal edge 11 of the spigot are complementarily tapered or beveled. The beveling of these portions facilitates the centering of the spigot within the bell, and promotes the desired squeezing and distribution of the plastic sealing material, when the pipe ends are inserted one within the other and telescoped to ultimate position of assembly.

Figure 1:
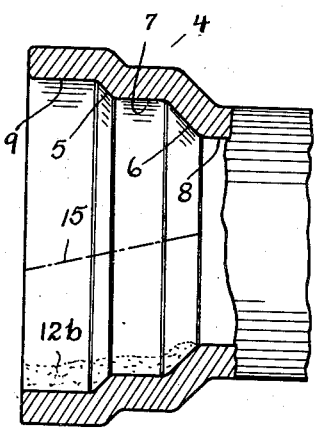
Figure 1 is a fragmentary view, showing partially in side elevation and partially in axial section a length of pipe formed at one end with the female or bell portion of the joint of the invention, and at the opposite with the male or spigot portion of the joint.
Figure 1:
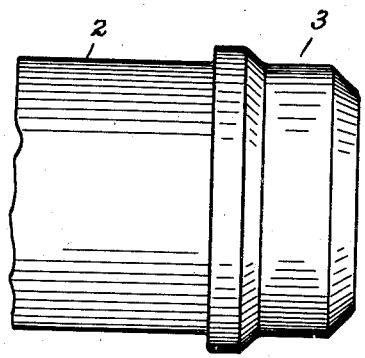
Figure 5:
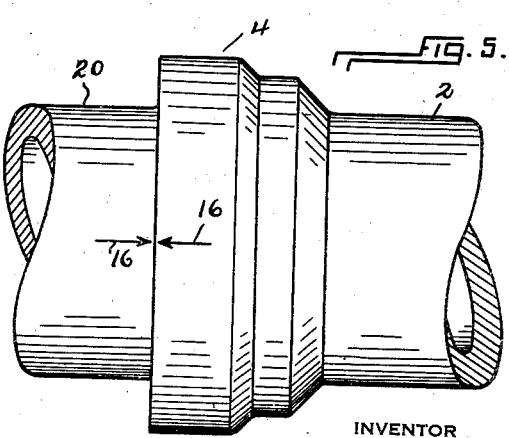
Figure 5 is a view of the pipe joint in elevation, illustrating certain indexes applied to the outer surfaces of the pipe ends, to insure in certain cases the desired angular registry of the telescoping pipe ends.

In making installations in which the pipes extend horizontally, the cement or sealing compound may be applied to the spigot portion upon the upper half only of its circumference, as indicated by the dotted shading 12a, Figure 2, and to the bottom half of the inside of the bell portion, as indicated at 12b, Figure 1. Upon diametrically opposite sides of the spigot, index lines 14 are provided, and on the opposite sides of the bore of the bell portion, index lines 15 are likewise provided. The coatings of cement or sealing material applied respectively to the spigot and bell portions are cut away or trimmed to these index lines, and it will be noted that the index lines are so inclined that when the spigot is inserted in the bell portion, the edges of the cement coatings are forced together, forming a united sleeve of cement between the spigot and bell portions. When the pipe ends are forced into completely telescoped position, the joint is completed. Conveniently, an index 16, Figure 5, is provided on the external suface of each pipe end, so that the two pipe ends may be aligned in such manner that the trimmed edges of the coatings of cement will meet as desired when the pipe ends are assembled.

Various modifications of the structure illustrated and described are permissible within the terms and intent of the appended claim.

I claim as my invention:

A bell-and-spigot pipe joint comprising two pipe members, one having a bell portion including internally two concentric beveled shoulders of unequal diameters, and the other having a spigot portion adapted to enter said bell portion and to be arranged with the terminal of the spigot portion positioned opposite the shoulder of smaller diameter, said spigot portion having spaced from its terminal a beveled annular rib which forms, with the beveled shoulder of larger diameter within the bell portion, a closed cement-receiving chamber.

THOMAS F. PAYNE.